(12) United States Patent
Huelz et al.

(10) Patent No.: US 12,049,924 B2
(45) Date of Patent: Jul. 30, 2024

(54) SEALING ARRANGEMENT FOR A WHEEL BEARING

(71) Applicant: Schaeffler Technologies AG & Co. KG, Herzogenaurach (DE)

(72) Inventors: Christian Huelz, Oberschwappach (DE); Branko Katana, Herzogenaurach (DE); Felix Gessner, Massbach (DE); Andreas Becker, Fuchsstadt (DE); Marco Krapf, Burkardroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 84 days.

(21) Appl. No.: 17/782,199

(22) PCT Filed: Nov. 5, 2020

(86) PCT No.: PCT/DE2020/100948
§ 371 (c)(1),
(2) Date: Jun. 3, 2022

(87) PCT Pub. No.: WO2021/121466
PCT Pub. Date: Jun. 24, 2021

(65) Prior Publication Data
US 2023/0003257 A1     Jan. 5, 2023

(30) Foreign Application Priority Data

Dec. 16, 2019  (DE) .................... 10 2019 134 516.2
Feb. 28, 2020  (DE) .................... 10 2020 105 299.5

(51) Int. Cl.
*F16C 33/78*     (2006.01)
*F16C 19/18*     (2006.01)
*F16C 33/58*     (2006.01)

(52) U.S. Cl.
CPC ........ *F16C 33/7879* (2013.01); *F16C 19/186* (2013.01); *F16C 33/583* (2013.01); *F16C 2326/02* (2013.01)

(58) Field of Classification Search
CPC .. F16C 19/186; F16C 33/583; F16C 33/7826; F16C 33/7869; F16C 33/7879; F16C 33/805; B60B 27/0073
See application file for complete search history.

(56) References Cited

U.S. PATENT DOCUMENTS 8,979,385 B2 * 3/2015 Haepp ................. F16C 33/7886
                                                       384/488
9,925,830 B2 * 3/2018 Barberis ............. F16C 33/7883
(Continued)

FOREIGN PATENT DOCUMENTS

CN     101249776 A     8/2008
CN     103348153 A     10/2013
(Continued)

*Primary Examiner* — James Pilkington

(57) ABSTRACT

A sealing arrangement for a wheel bearing having a first bearing part and a second bearing part integrally connected to a wheel bearing flange, and rolling bodies being guided between said bearing parts, includes a carrier element and a stop part. The carrier element is connected to the first bearing part, an elastic element is provided on the carrier element, and the carrier element has a fastening section connected to the first bearing part. The elastic element has a sealing lip. The stop part is fastened to the second bearing part and in sliding contact with the sealing lip. The wheel bearing flange has an axial projection provided such that the projection protrudes in the direction of a cavity formed by an axial projection of the first bearing part. An inner surface of the axial projection of the wheel bearing flange forms a seat for the stop part.

19 Claims, 2 Drawing Sheets

(56) References Cited

U.S. PATENT DOCUMENTS

| | | | |
|---|---|---|---|
| 10,479,139 B2 * | 11/2019 | Tada | F16C 33/7876 |
| 2014/0003753 A1 * | 1/2014 | Haepp | F16C 33/805 |
| | | | 384/480 |
| 2015/0003766 A1 | 1/2015 | Duch et al. | |

FOREIGN PATENT DOCUMENTS

| | | |
|---|---|---|
| CN | 203297366 U | 11/2013 |
| CN | 105452692 A | 3/2016 |
| CN | 105605103 A | 5/2016 |
| CN | 111373167 A1 | 7/2020 |
| DE | 10358876 A1 | 7/2005 |
| DE | 102009052311 A1 | 5/2011 |
| DE | 102010034385 A1 | 2/2012 |
| DE | 102013220074 A1 | 4/2015 |
| DE | 102013217299 B4 | 9/2018 |
| DE | 102018105560 A1 | 6/2019 |
| DE | 102010064672 B3 | 10/2019 |
| JP | 2010106925 A | 5/2010 |
| WO | 2019114853 A1 | 6/2019 |
| WO | 2019158151 A1 | 8/2019 |

* cited by examiner

SEALING ARRANGEMENT FOR A WHEEL BEARING

CROSS-REFERENCE TO RELATED APPLICATIONS

This application is the United States National Phase of PCT Appln. No. PCT/DE2020/100948 filed Nov. 5, 2020, which claims priority to German Application Nos. DE102019134516.2 filed Dec. 16, 2019 and DE102020105299.5 filed Feb. 28, 2020, the entire disclosures of which are incorporated by reference herein.

TECHNICAL FIELD

The present disclosure relates to a sealing arrangement of a wheel bearing, in particular for motor vehicles.

BACKGROUND

In the case of wheel bearings, a sliding seal on both sides of the space that receives the raceways and rolling bodies and is filled with lubricant must ensure that neither solid particles nor corrosive media can penetrate this space. Since there can be slight tilting within the bearing during lateral acceleration when driving, there is a risk that the lip seals used will lift off the sliding surfaces. The seals used can interact with a centrifugal sheet made of formed sheet metal. The centrifugal sheet connected to a rotating wheel hub or a wheel bearing flange can form an additional sealing labyrinth together with another sheet metal ring arranged in a stationary part of the wheel suspension. In addition, sealing lips of at least one sealing ring run in the axial or radial direction and are guided on the centrifugal sheet. The aforementioned components of the seal can also be an integral part of a seal cartridge in which the sealing lips are axially prestressed in a defined manner.

Axially on the vehicle side of the wheel bearing there is a mainly axially directed opening between the rotating partners involved, which is occasionally covered by a joint bell of the adjacent constant velocity joint. On the axial side of the wheel flange, the opening between the rotating partners of the wheel bearing is directed radially outwards due to the immediately adjacent wheel flange and is very easy to reach for spray water. Since a centrifugal sheet made of sheet metal on the wheel flange leads to better rubbing sealing contact than the usually untreated inner side of the wheel flange, a centrifugal sheet is mounted adjacent to the wheel flange before the wheel bearing is installed on the wheel hub.

A slippage of the centrifugal sheet can be triggered by a shock, continuous vibration loads or other causes, whereby the centrifugal sheet on the outer surface approaches the rolling bodies axially and damages them if they come into contact. This leads to failure of the wheel bearing.

A bearing seal for wheel bearings is known from DE 10 2010 034 385 A1, in which a centrifugal sheet is fixed to a wheel bearing flange, which is integrally connected to a rotating bearing ring of the wheel bearing. Sealing lips of a sealing arrangement are supported on the centrifugal sheet, which is coupled to the further torsionally rigid bearing ring.

DE 10 2009 052 311 A1 describes a wheel bearing with a sealing arrangement which includes a centrifugal ring on the flange side for sealing the roller bearing. In the installed state, axial sealing lips are supported on the centrifugal sheet via rubbing sealing contacts. The sealing lips are associated with a carrier that is attached to an outer ring.

DE 103 58 876 A1 discloses a sealing arrangement for wheel bearings, which uses two sealing rings to form an axial opening between the two parts of the wheel bearing that can rotate relative to one another and seals the wheel bearing axially. For this purpose, the two sealing rings form a gap labyrinth, which has a catch channel with a sealing gap that opens out axially and extends radially.

SUMMARY

The present disclosure provides a sealing arrangement which seals reliably over the operating life and has an increased service life.

According to the disclosure, a sealing arrangement of a wheel bearing has a first bearing part and a second bearing part which is integrally connected to a wheel bearing flange, and rolling bodies are guided between the first bearing part and the second bearing part. The sealing arrangement includes the following:

a carrier element, which is connected to the first bearing part, with an elastic element provided on the carrier element, the elastic element having at least one sealing lip, and the carrier element has a fastening section connected to the first bearing part, a stop part which is fastened to the second bearing part and with Which the at least one sealing lip is in sliding contact, the wheel bearing flange has an axial projection, and the axial projection of the wheel bearing flange is provided such that said projection protrudes in the direction cavity formed by an axial projection of the first bearing part, and an inner surface of the axial projection of the wheel bearing flange forms a seat for the stop part.

In known sealing arrangements, a stop part is pulled onto the second bearing part in the region adjacent to the wheel bearing flange. However, this region of the seat of the stop part is one of the most stressful regions of the second bearing part and the wheel bearing flange. Excited by high stress, which is caused by vibrations, etc., for example, the starting part moves axially. The axial migration causes the approach part to approach the rolling bodies, which can damage them if they come into contact.

In the sealing arrangement according to the disclosure, the wheel bearing flange therefore has an axial projection, the axial projection of the wheel bearing flange is provided such that said projection protrudes in the direction cavity formed by an axial projection of the first bearing part, and an inner surface of the axial projection of the wheel bearing flange forms a seat for the stop part. With such a design, the seat of the sealing plate is moved out of the most stressful region. The fact that the contact part is now seated on the axial projection of the wheel bearing flange means that the contact part can be prevented from moving. In the region in which stop part was seated according to the state of the art, this is now contactless. Due to the arrangement of the projections relative to one another, there is sufficient installation space for the fastening screws on the wheel flange, as a result of which simple assembly/disassembly of the rim and/or brake disc is possible.

According to one embodiment, a first sealing gap is formed between an end face of the axial projection of the wheel bearing flange and an end face of the first bearing part. This sealing gap defines the pre-seal or the labyrinth seal. This makes it difficult for contamination or the like to enter. At the same time, the sealing gap diverts the resulting force from the wheel flange to the first bearing part in the event of axial impacts which act on the second bearing part or the wheel bearing flange. This prevents damage to the rolling bodies.

The carrier element may be fastened to an inner peripheral surface of the first bearing part with the fastening section. This prevents this seat from being infiltrated by contaminants or the like and corrosion from occurring, which negatively affects the sealing arrangement.

According to one embodiment, the carrier element is designed in such a way that it forms a free space and a cage of a bearing protrudes into this free space. The support element has a course which is oriented in the direction of the wheel flange and not in the direction of the rows of bearings. As a result, a free space is again created into which a cage of the rows of bearings can protrude. With this design, overall installation space can be saved in an axial direction of the wheel bearing unit and the wheel bearing unit is therefore axially narrow.

According to one embodiment, at least one first drainage channel is provided on an outer peripheral surface of the carrier element and/or the elastic element. This drainage channel reinforces the sealing effect and prevents the ingress of contaminants or the like into the interior. The elastic element may provide a sealing lip which delimits the first drainage channel.

One embodiment provides that the wheel bearing flange facing the wheel bearing is formed with a radially extending side face and an outer surface adjoining rolling body raceways on the second bearing part in the direction of the wheel bearing flange and receiving the stop part, and in that a radial and/or axial circumferential groove is arranged in a transition region between the outer surface and the side face. The fact that the stop part no longer has a seat in this region means that the groove or this region can be designed in such a way that this leads to an improvement in the strength of the component. The groove can, in each case, be arranged entirely or partially in the outer surface and/or the side face.

A groove base of the groove may be formed with at least one radius. The at least one radius of the groove can be adapted to different geometries of the wheel bearing flange in order to minimize stress in the transition region and to increase component strength. A single radius as well as a plurality of radii can be provided.

A free space may be formed between the transition region of the stop part and the groove base. Grease or sealant can accumulate in this free space and be optimally distributed, which further improves the fit of the stop sheet.

According to one embodiment, at least one second drainage channel is provided on an outer peripheral surface of the first bearing part. This second drainage channel reinforces the sealing effect and prevents the ingress of contaminants or the like into the sealing labyrinth.

BRIEF DESCRIPTION OF THE DRAWINGS

Exemplary embodiments are illustrated below using two figures. In the figures.

DETAILED DESCRIPTION

Figure 1:
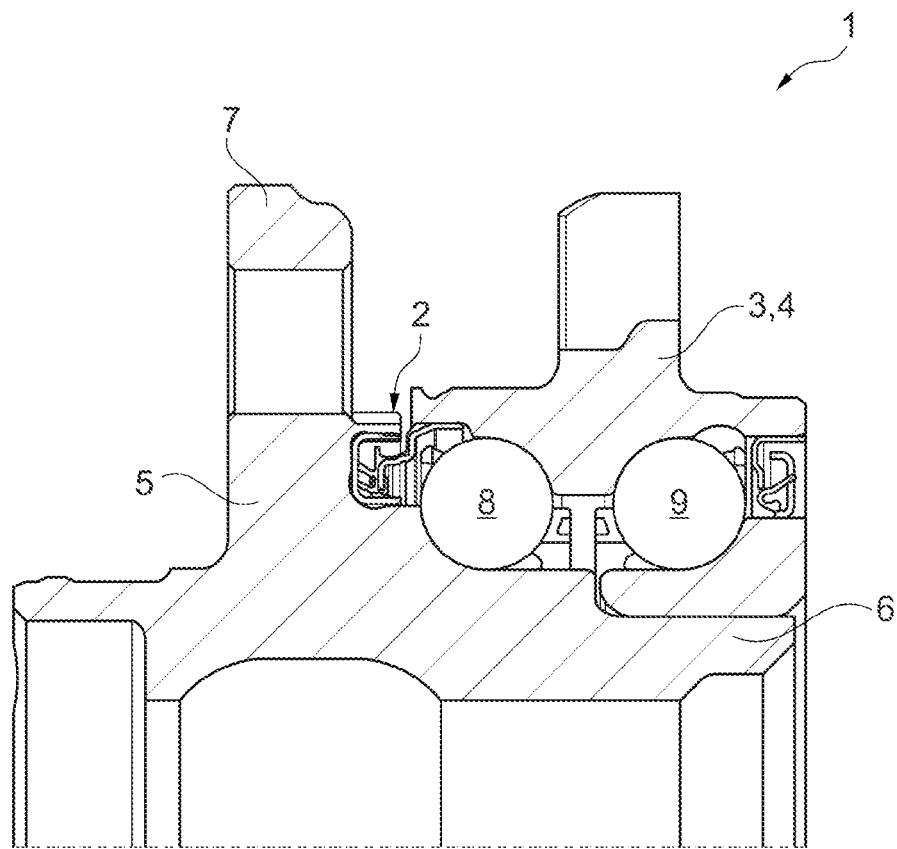
FIG. 1 shows a longitudinal section of a wheel bearing having a sealing arrangement according to the disclosure.

FIG. 1 shows a longitudinal section of a wheel bearing 1, shown only in section, having a sealing arrangement 2. The wheel bearing 1 has a first bearing part 3, which is designed as an outer ring 4 and is connected to a wheel carrier (not shown) when installed. A second bearing part 5 is further provided, which forms the inner ring 6. The second bearing part 5 has a wheel bearing flange 7 connected in one piece. Two rows of rolling bodies 8, 9 are guided between the first bearing part 3 and the second bearing part 5.

Figure 2:
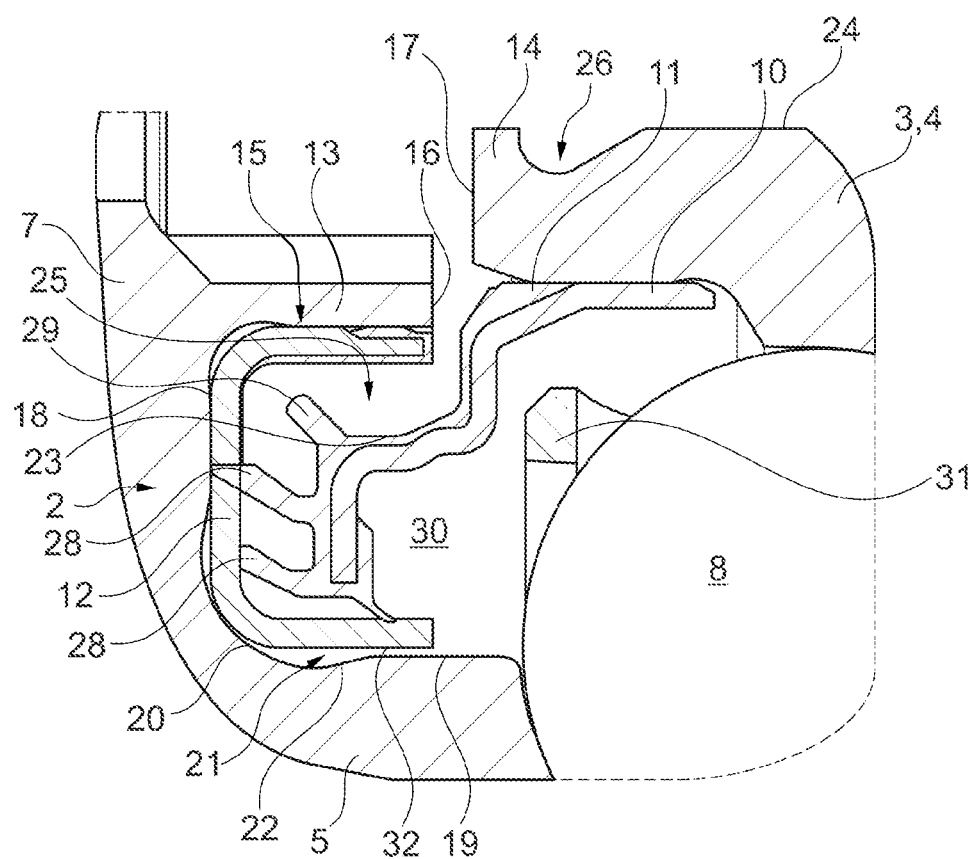
FIG. 2 shows an enlarged view of a sealing arrangement according to a second embodiment of the disclosure.

The sealing arrangement 1 of the wheel bearing 2 is shown in more detail in FIG. 2. This includes a carrier element 10 which is connected to the inner circumference of the first bearing part 3 by means of a press fit. An elastic element 11 is provided on the carrier element 10, the elastic element 11 having at least one sealing lip. The carrier element 10 further has a fastening section for fastening to the first bearing part 3. In order to avoid rusting under the fastening section, a so-called static seal is formed by means of a sealing ring molded onto the elastic part.

The sealing arrangement further has a stop part 12 which is fastened to the second bearing part 5 and on which two sealing lips 28 are in sliding contact. It can also be seen that the wheel bearing flange 7 has an axial projection 13. This axial projection 13 is provided in such a way that it protrudes in the direction of a cavity formed by an axial projection 14 of the first bearing part 3. The interior space which is formed and delimited by the two bearing parts 3, 5 is meant as a cavity. The axial projection 13 extends, so to speak, in the direction of the rows of rolling bodies 8, 9. Based on this design, a pre-seal is formed in the form of a labyrinth. Here, a first sealing gap is formed between an end face 16 of the axial projection 13 of the wheel bearing flange 7 and an end face 17 of the first bearing part 3. The end face 17 of the first bearing part is formed on a side face which adjoins the projection 14 radially and extends radially away from the rows of rolling bodies 8, 9.

In addition, the carrier element 10 is designed in such a way that it forms a free space 30. A cage 31 of a row of rolling bodies 8 protrudes into this free space 30.

Furthermore, an inner surface 15 of the axial projection 13 of the wheel bearing flange 7 forms a seat for the stop part 12. This eliminates the seat known from the prior art in the region of the transition between the second bearing part 5 and the wheel bearing flange 7.

A radially extending side face 18 adjoins the axial projection 13. Furtheimore, an outer surface 19 adjoining the second bearing part 5 and adjoining rolling body raceways in the direction of the wheel bearing flange 7 is provided. The outer surface 19 can be cylindrical and have a conical shape. This outer surface 19 transitions into the radially extending side face 18 in a transition region 20. A radial and/or axial circumferential groove 21 is formed in the transition region 20. The groove 21 can be adapted to the respective geometry of the wheel bearing flange 7. A groove base 22 of the groove 21 is formed with at least one radius. A free space 32 is formed between the groove base 22 and the stop part 12. This free space 32 can be used to store sealant, grease, etc.

Furthermore, it can be seen from FIG. 2 that a first drainage channel 25 is provided on an outer peripheral surface 23 of the elastic element 11. The first drainage channel 25 is delimited by a sealing lip 29. A second drainage channel 26 is further provided on an outer peripheral surface 24 of the first bearing part 3. These drainage channels 25, 26 form a type of pre-seal which is intended to reduce the ingress of dirt into the interior of the bearing.

REFERENCE NUMERALS

1 Wheel bearing
2 Sealing arrangement

3 First bearing part
4 Outer ring
5 Second bearing part
6 Inner ring
7 Wheel bearing flange
8 Row of rolling bodies
9 Row of rolling bodies
10 Carrier element
11 Elastic element
12 Stop part
13 Projection of the wheel bearing flange
14 Projection of the first bearing part
15 Inner face
16 End face
17 End face
18 Side face
19 Outer surface
20 Transition region
21 Groove
22 Groove base
23 Outer peripheral surface
24 Outer peripheral surface
25 First drainage channel
26 Second drainage channel
28 Sealing lip
29 Sealing lip
30 Free space
31 Cage
32 Free space

The invention claimed is:

1. A sealing arrangement for a wheel bearing having a first bearing part and a second bearing part integrally connected to a wheel bearing flange, rolling bodies being guided between said bearing parts, the sealing arrangement comprising the following:
   a carrier element which is connected to the first bearing part, an elastic element being provided on the carrier element, the elastic element having at least one sealing lip, and in that the carrier element has a fastening section connected to the first bearing part,
   a stop part which is fastened to the second bearing part and with which the at least one sealing lip is in sliding contact,
   the wheel bearing flange having an axial projection, wherein the axial projection of the wheel bearing flange is provided such that said projection projects in the direction of a cavity formed by an axial projection of the first bearing part, and wherein an inner surface of the axial projection of the wheel bearing flange forms a seat for the stop part, wherein the axial projection of the wheel bearing flange is axially spaced from and does not overlap the axial projection of the first bearing part when viewed in a radial direction.

2. The sealing arrangement according to claim 1, wherein an end face of the axial projection of the wheel bearing flange and an end face of the first bearing part form a labyrinth seal.

3. The sealing arrangement according to claim 1, wherein the carrier element is fastened to the fastening section on an inner peripheral surface of the first bearing part.

4. The sealing arrangement according to claim 1, wherein the carrier element is designed in such a way that it forms a free space and wherein a cage for the rolling bodies projects into this free space.

5. The sealing arrangement according to claim 1, wherein at least one first drainage channel is provided on an outer peripheral surface of the elastic element.

6. The sealing arrangement according to claim 5, in which the elastic element provides a sealing lip which delimits the first drainage channel.

7. The sealing arrangement according to claim 1, wherein the wheel bearing flange is formed with a radially extending side face and an outer surface adjoining rolling body raceways on the second bearing part, and a radial or axial circumferential groove is arranged in a transition region between the outer surface and the side face.

8. The sealing arrangement according to claim 7, wherein a groove base of the groove is formed with at least one radius.

9. The sealing arrangement according to claim 8, wherein a free space is formed between the stop part and the groove base.

10. The sealing arrangement according to claim 1, wherein at least one second drainage channel is provided on an outer peripheral surface of the first bearing part.

11. A sealing arrangement for a wheel bearing, the wheel bearing comprising:
   a first bearing part comprising an axial projection and an inner peripheral surface;
   a second bearing part, comprising a wheel bearing flange, the wheel bearing flange comprising an axial projection protruding towards a cavity formed by the first bearing part axial projection, and a seat; and
   rolling bodies disposed between the first bearing part and the second bearing part;
   the sealing arrangement comprising:
   a carrier element comprising a fastening section fastened to the inner peripheral surface;
   a stop part fastened to the second bearing part at the seat; and
   an elastic element arranged on the carrier element and comprising a first sealing lip in sliding contact with the stop part, wherein the axial projection of the wheel bearing flange is axially spaced from and does not overlap the axial projection of the first bearing part when viewed in a radial direction.

12. The sealing arrangement of claim 11, wherein:
   the first bearing part further comprises an end face; and
   the wheel bearing flange axial projection comprises an end face; and
   the first bearing part end face and the wheel bearing flange axial projection end face form a labyrinth seal.

13. The sealing arrangement of claim 11, wherein:
   the carrier element forms a free space; and
   the wheel bearing further comprises a cage that projects into the free space.

14. The sealing arrangement of claim 11, further comprising a first drainage channel disposed on an outer peripheral surface of the elastic element.

15. The sealing arrangement of claim 14, further comprising a second sealing lip, wherein the second sealing lip delimits the first drainage channel.

16. The sealing arrangement of claim 11 further comprising a second drainage channel, wherein:
   the first bearing part comprises an outer peripheral surface; and
   the second drainage channel is disposed on the outer peripheral surface.

17. A sealing arrangement for a wheel bearing, the wheel bearing comprising:
   a first bearing part comprising an axial projection;
   a second bearing part, comprising a wheel bearing flange, the wheel bearing flange comprising an axial projection protruding towards a cavity formed by the first bearing part axial projection, and a seat; and rolling bodies disposed between the first bearing part and the second bearing part;

the sealing arrangement comprising:

a carrier element comprising a fastening section connected to the first bearing part;

a stop part fastened to the second bearing part at the seat; and an elastic element arranged on the carrier element and comprising a first sealing lip in sliding contact with the stop part, wherein:

the axial projection of the wheel bearing flange is axially spaced from and does not overlap the axial projection of the first bearing part when viewed in a radial direction;

the second bearing part further comprises a rolling body raceway;

a portion of the wheel bearing flange facing the rolling bodies comprises a radially extending side face and an outer surface adjoining the rolling body raceway;

the outer surface receives the stop part; and a radial circumferential groove or an axial circumferential groove is arranged in a transition region between the outer surface and the radially extending side face.

18. The sealing arrangement of claim 17 wherein the groove comprises a groove base formed with a radius.

19. The sealing arrangement of claim 18 further comprising a free space formed between the stop part and the groove base.

* * * * *